United States Patent Office 3,232,231
Patented Feb. 1, 1966

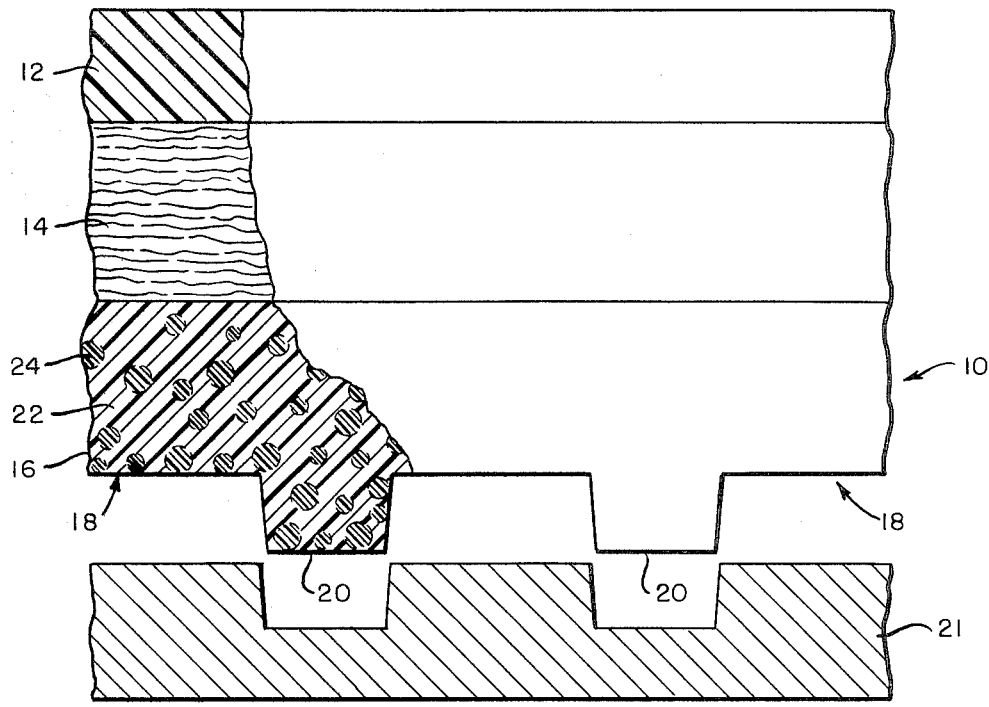

3,232,231
PLASTIC PRINTING PLATES
John De Maria, Rehoboth, Mass., and William B. Glen, Cranston, R.I., assignors to Chemical Products Corporation, East Providence, R.I., a corporation of Rhode Island
Filed Sept. 13, 1962, Ser. No. 223,348
13 Claims. (Cl. 101—395)

The present invention concerns a composition for and method of fabricating plastic sheets of enhanced abrasion resistance, and particularly to a composition for and method of preparing a relief printing plate having superior printing surface abrasion resistance. More particularly the invention relates to a printing plate having enhanced abrasion resistance and superior printing life prepared by the selective solvation of a vinyl resin facing layer.

In the past resin films have been employed as the facing layers of flexible printing plates. However, one of the primary disadvantages of these printing plate surfaces has been the lack of suitable abrasion resistance of the facing or printing contact surface, the unsuitable toughness of the printing surface has thus restricted the full commercial development of vinyl resin films as printing surfaces.

It is an object of the present invention to provide a vinyl resin composition capable of being processed to obtain a plastic sheet, and especially a printing plate facing layer having enhanced abrasion resistance. Another object is to provide a method for preparing flexible lightweight printing plates of good resolution and of excellent printing surface toughness. A further object of this invention is to provide a method of controlling the hardness and abrasion resistance of the resin surface such as the facing layer of a printing plate. An additional object of this invention is to provide a printing plate which can be rapidly and easily composed and which has a facing layer of superior toughness and abrasion resistance to permit a large number of ink impressions to be produced therefrom. Other objects and advantages of this invention will be made more apparent to those skilled in the art from the following detailed description and disclosures thereof, taken in conjunction with the drawing.

The drawing is a diagrammatical view of a three layer printing plate in registry with a relief matrix with a fragmentary cross sectional view of the layers.

The objects of this invention are attained by the discovery that vinyl resin compositions such as liquid plastisol compositions of controlled resin particle size distribution can be selectively solvated to provide enhanced abrasion resistance to thermoplastic films, and especially to the facing layers of plastisol printing plates. By the instant discovery, the tough characteristic of the relatively large size resin particles are carried over into the solid fused homogeneous state. In the present composition and method there is employed a critical range of relatively large size and relatively small size of vinyl resin particles. In these plastisol compositions sufficient plasticizer is employed to completely solvate the relatively small size polyvinyl chloride (PVC) resin particles and to partially or incompletely solvate the larger size PVC resin particles.

Conventionally selective solvation of plastisol compositions has been accomplished by carefully controlling the temperature of solvation. This method is difficult to control and impractical, in that solvation is effected by the degree of heat-transfer, the temperature used, and other factors, and furthermore, imposes limitations on the processed temperatures that can be employed. By the present discovery normal fusing temperatures can be used, since the level of plasticizer with the particular resin particle sizes employed inhibits complete solvation of the relatively larger size resin particles, although very high temperatures for prolonged periods of time should be avoided as tending to degrade the larger resin particles.

Resin particle variations have been employed to alter the viscosity characteristics of liquid vinyl plastisol compositions. However the resin particles previously employed have been used with the intention of subsequently completely solvating these resins during the fusing cycle. In general the present commercial practice is to use the lowest molecular weight polyvinyl chloride resin possible commensurate with the toughness of the film desired, and to use the lowest fusion temperature possible. To obtain a proper balance of fusion temperatures and toughness it has been then the practice to employ relatively small size resin particles of high molecular weight.

In the present invention to obtain the optimum advantages the particle size differences between the relatively small resin particles and the relatively large resin particles should be of the order of 10 to 100. In the practice of this invention there is employed major amounts of the relatively small resin particles sizes sufficient to completely solvate under the process conditions employed that is dispersion grade polyvinyl chloride polymers having an average particle size diameter of less than 10 microns for example from 0.1 to 5 microns and having a molecular weight of about 40,000 to 80,000. Optimum results are achieved by using a minor amount of a relatively large size resin particle having an average particle size of at least 75 microns for example, 75 to 100 microns. When employed in the facing surface of the printing layer of printing plates, the upper limit on the relatively large size resin particles should be equal to or less than the highlight dots in the half tones of the plate mold being copied that is: normally not more than 100 to 150 dots per linear inch. Thus the resin particles in the liquid vinyl resin composition comprises a dumbbell effect of small resin particles at one end of the dumbbell and relatively large resin particles at the other end of the dumbbell. Sufficient amounts of the relatively large resin particles are used to prevent complete solvation of these resin particles in the plasticizer employed with the optimum ranges of the resin particles commonly 5 to as high as 50 weight percent of the liquid resin-plasticizer dispersion for example, 15 to 40 weight percent. Larger amounts of the large particulate resin particles give process and handling difficulties due to the tendency of the larger particles to rapidly settle while in the liquid plasticizer. Smaller amounts of the larger resin particle size are generally of diminishing effectiveness in promoting superior abrasion resistance due to the relatively wide dispersion of these large insolvated resin particles in the fused plastic continuum. As the amount of relatively large resin particles size progressively decreases from 15 weight percent there is a sharp progressive decrease in the abrasion resistance of the printing surface obtained.

In the fusing process solvating temperatures of over 300 for example 300 to 400° F. are normally employed since at these fusing temperatures the plasticizer solvates the relatively small particles and only partially or slightly solvates the relatively large particle leaving the relatively large particles dispersed within the fused plastic resin continuum. At lower gelling temperatures of about 180 to 250° F. the liquid plastisol composition increases rapidly in viscosity and becomes gelled. The primary plasticizer which is wholly compatible with the vinyl resin components of the resin composition doesn't discriminate between the large and small particles resin sizes, but the rate of solvation at the solvating temperature depends upon the area of exposure of the particles to the plasticizer and the time and temperature of the process and the molecular weight of the resins employed. As the molecular weight of the resin particles is increased, the rate of solvation is slower. Therefore, although both particles sizes may be of similar molecular weight, in one embodiment of this invention it is preferred to have a difference in molecular weights between the large and small particles such as to have the relatively large resin particles of higher molecular weight than the relatively small resin particles to further inhibit the solvation of the large particles. For example, a molecular weight difference as measured by the specific viscosity in ASTM D-1243-60 of 0.50 can be employed to further inhibit solvation of the relatively large particle size and to provide a harder solid dispersed resin particle phase in the gelled and fused plastisol film. The employment of resin particles of similar particle size, but of different molecular weight to effect controlled solvation is not wholly successful since in the solvation rate the difference in molecular weight is considerably less than the difference in particle size of the commercial available resins. By the present invention then, enhanced abrasion resistance is obtained of the incompletely fused large resin particles in the fused film continuum, since the abrasion resistance increases dramatically with the hardness of the resin particles in the fused continuum, the larger size incompletely solvated resin particles are harder and tougher than the surrounding continuum not because they are originally harder although that could be, but because they are incompletely solvated and dispersed in a fully solvated matrix or solid solution.

The synthetic thermo plastic resins used in the present plastisol composition which comprises a viscous fluid flowable dispersion of a vinyl resin in powdered, diced or other particulate resin form in a non-volatile plasticizer are primarily those homo- and copolymers of vinyl halide and particularly a vinyl chloride. Suitable resins include but are not limited to: polyvinyl chloride; vinyl chloride-vinylidene chloride copolymers containing from 1 to 20 weight percent of vinylidene chloride; vinyl chloride-vinyl ester copolymers such as vinyl chloride-vinyl acetate copolymers; copolymers of vinyl chloride with a vinyl alcohol, and polyvinyl aromatic compound like styrene; terpolymers of these resins containing alkyl dibutadienoic esters such as ethyl maleate and combinations and admixtures of these resins and the like. The preferred commercially available synthetic thermo plastic vinyl resin dispersion material is polyvinyl chloride.

The vinyl resin-plasticizer compositions or liquid binder compositions employed may include both organic and inorganic inner filter materials or non-binder ingredients. Suitable filler materials include but are not limited to: diatomaceous earths; metal powder like aluminum powder; metal oxide, like titanium oxide, magnesium oxide, iron oxide; metal carbonates like calcium carbonate; limestone, graphite, carbon black, talc, clay, asbestos, cellulosic fibers such as cotton, and the like, glass fibers, synthetic fibers like polyesters, polyethers, polyamides, acrylates, etc. and other woven and non-woven fabrics; wood flour, etc Additionally, the resin compositions may comprise non-binder ingredient such as light and heat stabilizers of from up to 5 weight percent, e.g. 1 to 3 weight percent such as metal fatty acid salts like calcium cadmium and zinc stearate, metal complexes like organo tin complexes, epoxy resins and epoxidized oils; pigments from up to 15 percent, e.g. 1 to 5 percent; lubricants like hydrocarbon waxes and oils such as paraffin wax; and wetting agents such as lecithin, long chain alcohol esters of fatty acids like alkylene glycol esters, e.g. propylene glycol laurate, glycerol mono-oleates, etc. The total non-binder ingredients may comprise from 0 to 100 weight percent of the resin composition with from 20 to 60 weight percent common. Of course, the resin compositions may include minor amounts of other natural and synthetic thermoplastic or elastomeric materials which may be added to the resin either as plasticizers, solvated materials or dispersed materials to obtain other desired properties. Such materials include butyl rubber, natural rubber, polyvinyl acetate, polybutadiene, isobutylene, polyisoprene, halogenated butyl rubber, polyolefins like polyethylene and polypropylene, styrene-butadiene copolymers, polyurethane styrene-acrylonitrile copolymers and the like.

Conventional non-volatile primary plasticizers are employed in amounts sufficient to solvate the relatively small resin particles in order to form a continuum film having dispersed therein solid incompletely solvated larger resin particles. Particularly suitable plasticizers include those monomeric and polymeric primary plasticizers that are fully compatible with the vinyl resin components of the binder resin composition such as: those aliphatic esters of carboxylic acids such as those alkyl and alkoxyl esters of polycarboxylic acids like dialkyl and dialkoxy and alkyl-alkoxy esters of dicarboxylic acids such as dimethylphthalate, dibutylphthalate, dioctylphthalate, dibutyl sebacate, dioctyl sebacate, dibutoxy ethylphthalate, octyldecyl adipate, and the like; phosphates such as alkyl phosphates like trioctylphosphate and other phosphates, phthalates, and isophthalate in combinations and mixtures thereof. Additionally low molecular weight polymeric materials such as adipic and sebacic acid polyesters and the like can also be used. Further secondary plasticizers such as alkyd resins, aromatic hydrocarbon condensates, chlorinated paraffin, etc., which are less compatible with the resin binder can be used in combination with primary solvent-type plasticizers, as described above. The primary plasticizer normally comprises a minor amount of from 15 to 50 weight percent of the total resin binder for example from 15 to 30 weight percent. The resin compositions may also include minor amounts say from 0 to 3 weight percent of metal soaps used in the manufacture of the particular resins employed such as metal fatty acids, soaps like stearates and oleates of calcium, magnesium, zinc and the like. The presence of the metal soaps inhibits the rate of solvation and therefore are not particularly desirable when used in conjunction with the small resin particles, but may be desirable when coated on or in the large resin particles.

The invention may be more fully described in reference with the following example in FIG. 1.

*Example I*

A resin facing plastisol composition was prepared comprising the following information:

| Ingredients: | Weight percent |
|---|---|
| PVC resin A [1] | 20.0 |
| PVC resin B [2] | 22.0 |
| PVC resin C [3] | 25.0 |
| Di (2 ethylhexyl) isophthalate | 23.8 |
| Dioctyl adipate | 0.5 |
| Diisooctyl phthalate | 1.0 |
| Mold release agent | 1.0 |
| Metal containing pigment compounds | 1.8 |
| Epoxidized soybean oil | 1.7 |
| Tri basic lead sulfate | 3.2 |

[1] A has an inherent viscosity by ASTM D-1232-60 of 1.16 and 75% of the resin particles are between 3 and 10 microns in size.
[2] B has an inherent viscosity by ASTM D-1243-60 of 1.11, and has an average resin particle size of about 5 microns.
[3] C has an inherent viscosity by ASTM D-1243-60 of 0.92, and has a resin particle size distribution of about 75%, between 70-100 microns, 2 to 5% average of 149 microns and less than 2% average 177 microns.

The above liquid vinyl polymer plastisol formulation is then dipped, sprayed, rolled, or poured on to a positive or negative matrix relief plate free of dust or other dirt particles with the thickness of the liquid film preferably equal in depth to the desired relief image to be captured with uniform thickness of the film most desirable. The liquid polymer is then spread thinly over the mold relief surface using a straight edge knife or bar to remove the excess plastisol formulation, while exerting sufficient downward pressure to insure uniform thickness on the matrix. In critical areas the resin composition may be worked into the recesses by employing a spatula or brush. The relief matrix plates, together with the thin film of liquid heat gellable vinyl resin dispersion, is then heated at a temperature of 250 to 300° F., for example, 300° F. in an open pre-heated oven for a period of time sufficient for the open air surface of the plastisol film to acquire a rather dull appearance indicating the gelling and partial fusing of the plastisol film. Normally the mold and film are heated for ½ to 3 minutes for example 1 minute to give a soft plastic gelled plastisol film, that is, to form a solid non-flowable layer. Thereafter a reinforcing sheet or mat to serve as support for the relief image captured by the plastisol film composition is placed over and on top of the plastisol facing sheet. This reinforcing mat or sheet can be of any suitable material such as glass fibers, paper, polyester film, metal plate properly primed, rubber, woven textile fabrics such as cloth and the like, polyvinyl chloride or other thermoplastic thin sheet material or other thin flexible material of suitable supporting characteristics or multilayer combinations of the above. To insure strength and toughness the reinforcing mat is preferably composed of nonwoven randomly disposed glass fibers with an additional bonding sheet of a thin flexible polyvinyl chloride or other thermoplastic resin sheet, capable of being heat or pressure bonded or both to the reinforcing mat, placed on top of the glass fiber mat to securely bond the sheets to the facing sheet. Of course, the reinforcing mat can comprise a single flexible thin sheet of reinforcing material impregnated with a bondable thermoplastic resin or plastic. The facing layer, reinforcing mat and backing layer are then heated to a fusing temperature of above 300° F. for example, 350 to 400° F. for 8 to 12 minutes; for example, 8 minutes in a forced air convection oven or other heating means, and then optionally, while still warm, bonded in a cold press for a few seconds to bond the layers to each other. The thin flexible reinforced composite printing plate is then removed or peeled from the relief mold. In the high temperature fusing operation, all the relatively small PVC resin particles are fused to form a flexible fused continuum layer in which is dispersed the partially solvated relatively large resin particles now of a controlled diminished size because of selective solvation, but forming hard, tough, insoluble resin particles in the continuum. The degree of incomplete solvation of the large resin particles depend of course on the abrasion resistance desired.

The facing or ink receptive surface layer of the composite printing plate is now of enhanced toughness and abrasion resistance and may have a controlled variation in hardness of from 40 Shore A2 durometer scale to 80 Shore D durometer scale, depending upon the difference in resin particles size employed, the degree of solvation of the larger particle size resin, the molecular weights of the resin particles and resin concentration. The printing plate thus obtained has good dimensional stability, light weight, excellent ink acceptance and transfer characteristics and superior resiliency of backing regardless of surface hardness. The composite printing plate is now ready for side trimming and back grinding to uniform thickness and the desired shape. The plate is then mounted by any suitable means such as registration clips in a flat bed press or on a plate cylinder of a rotary press, and thereafter employed to transfer a substantial number of printed images from the hard ink receptive surface to ink accepting means, such as paper.

Turning now, more particularly, to the drawing, there is there shown a typical composite printing plate 10 comprising a backing layer or layers of polyvinyl chloride film 12 securely bonded through a glass fiber reinforcing mat 14 to a facing layer 16, the surface 18 of which is characterized by the raised relief projections 20 captured by the relief mold plate 21 upon which the liquid vinyl composition was poured. This facing layer is further characterized by a fully fused and plasticized solvated film section 22 representing the fused relatively small resin particles, and by the partially solvated relatively large tough resin particles 24 dispersed in the fused continuum. The printing surface 18 has a smooth appearance to the naked eye. While in microscopic cross-sectional view the large unsolvated resin particles either of spheroidal, cubed, or other shape are observed to be clear and substantially free of dye or pigment coloration indicating a lack of solvation of the large resin particles by the plasticizer. In use after a brief initial wearing of the printing surface, the resin particles are exposed to form the tough hard printing surface and to give area contact over the printing contact surface of superior toughness without effecting the printing quality or transfer acceptance characteristics of the plate. As shown, the layers 12, 14 and 16 are not of representative thickness but for purposes of illustration only, the composite plate normally of from .030 to .5 inch thickness with the facing layer of .005 to .25 inch, the reinforcing layer of .005 to .050 inch and a backing layer of .020 to .300 inch.

Where desired the use of direct radiation energy or heat on the back of the facing layer 16 may be employed to obtain increased solvation of the backing portion of this sheet to promote the handling characteristics while leaving the larger resin particles incompletely solvated on the printing surface. Although the invention has been described in particular with reference to printing plates, it is obvious that the compositions and methods employed can be utilized to form other plastic articles of manufacture of enhanced abrasion resistance, such as in fabricating surface covering materials like wall and floor tile, coverings for upholstery, side-walls of automobiles, book covers, gaskets and other surface contact areas where enhanced abrasion resistance and toughness is desirable. Films of enhanced abrasion resistance besides being cast from liquid plastisol compositions can also be prepared by calendering the described plasticizer-vinyl resin mixture usually containing lower levels of plasticizer, at below fusing temperatures to form a self-supporting vinyl resin film, and subsequently fusing the film at an elevated temperature to provide a tough flexible vinyl resin film continuum having dispersed therein the incompletely solvated large resin particles. Further the vinyl resin composition (solvated) can be extruded, calendered or cast onto woven textile fabrics or cellulosic backing sheets such as cotton or paper or other backing or supporting means to provide laminated structures of superior surface toughness.

It will be understood that various modifications in the method of fabrication and in the structure of the plate may be effected by the application and knowledge of those skilled in the plastisol art without departing from the spirit or scope of the present invention.

Having thus described our invention, what is claimed is:

1. A process of making a printing plate which process comprises: applying to a relief matrix a composition comprising a dispersion of vinyl resin particles in a nonvolatile liquid plasticizer, said resin particles comprising a mixture of relatively small resin particles and relatively large size resin particles the small resin particles having an average particle size of from about 0.5 to 10 microns and comprising a major amount of the total resin, the relatively large size resin particles being from 10 to 100 times the average particle size of the relatively small size particles; and said liquid plasticizer being present in amounts sufficient to completely solvate the relatively small size resin particles at an elevated temperature; heating the coated plastisol composition at an elevated temperature sufficient to completely solvate the small resin particles and to incompletely solvate the large resin particles; and removing the plastic resin sheet containing a fused vinyl resin with relatively large size resin particles, incompletely solvated, dispersed throughout to obtain a printing plate of enhanced surface abrasion characteristics.

2. A process as defined in claim 1 wherein said vinyl resin is polyvinyl chloride.

3. A process as defined in claim 1 wherein the liquid plasticizer comprises from about 15 to 50 weight percent of the total resin in the composition.

4. A process as defined in claim 1 wherein the average particle size of the relatively large size resin particles is from 75 to 100 microns.

5. A process as defined in claim 1 wherein the relatively small size resin particles have a different molecular weight than the relatively large size resin particles.

6. A process as defined in claim 1 which includes bonding a flexible backing sheet to the back surface of the fused resin sheet.

7. A process as defined in claim 1 wherein the amount of large resin particles is from about 15 to 40 weight percent of the resin-plasticizer content of the composition.

8. A process of making a printing plate which process comprises: coating onto a relief matrix a plastisol composition comprising a dispersion of vinyl chloride resin particles in a liquid non-volatile plasticizer, the resin particles comprising relatively small size particles having an average particle size of from 0.5 to 10 microns and from 15 to 40 weight percent of relatively large size resin particles having an average particle size of from about 75 to 100 microns and the liquid plasticizer comprising from about 15 to 50 weight percent of the total resin in the plastisol; heating the coated plastisol composition to form a gelled vinyl chloride resin sheet; placing a flexible compatible backing sheet onto the gelled resin; heating the gelled resin to an elevated fusing temperature sufficient to solvate the relatively small size resin particles and removing from the matrix a composite flexible printing plate having the backing bonded to the fused printing sheet and having a printing surface of enhanced abrasion resistance.

9. A process as described in claim 8 wherein the backing sheet is a thermoplastic backing sheet impregnated with non-woven randomly disposed glass fibers.

10. An improved printing plate comprising a backing sheet secured to a vinyl resin facing layer having on its surface a printing relief image and comprising a vinyl resin sheet characterized by a coherent continuum film of plasticized solvated vinyl resin and having dispersed throughout the continuum from 5 to 50 weight percent of relatively large vinyl resin particles having an average particle size of less than the highlight dots in the halftones of the plate mold from which the facing layer was copied.

11. The printing plate as described in claim 10 wherein the average size of the relatively large vinyl resin is from about 75 to 100 microns.

12. The printing plate as described in claim 10 wherein the relatively large vinyl resin particles are of a different molecular weight than vinyl resin continuum.

13. The printing plate as described in claim 10 wherein the backing sheet is a flexible thermoplastic sheet impregnated with non-woven fibers and bonded to the back of the facing layer.

References Cited by the Examiner
UNITED STATES PATENTS

| | | | |
|---|---|---|---|
| 1,401,633 | 12/1921 | Novotny | 101—395 |
| 2,108,822 | 2/1938 | Lippincott | 101—401.1 X |
| 2,450,435 | 10/1948 | McGillicuddy | 260—31.8 |
| 3,015,640 | 1/1962 | Weaver et al. | 260—31.8 |
| 3,031,959 | 5/1962 | Libberton | 101—395 |
| 3,042,644 | 7/1962 | Cowell | 260—31.8 |
| 3,113,514 | 12/1963 | Hogan | 101—395 X |

DAVID KLEIN, *Primary Examiner.*

WILLIAM B. PENN, *Examiner.*